United States Patent [19] | [11] 3,930,072
Wilks | [45] Dec. 30, 1975

[54] STABILIZATION OF METAL PLATING BATHS

[75] Inventor: Alan D. Wilks, Elk Grove, Ill.
[73] Assignee: Universal Oil Products Company, Des Plaines, Ill.

[22] Filed: June 28, 1974
[21] Appl. No.: 483,998

[52] U.S. Cl. .................... 427/306; 106/1; 427/98
[51] Int. Cl.² .................... B05D 3/10
[58] Field of Search .......... 117/227, 213, 47 A, 47 R; 106/1; 427/306, 98

[56] References Cited

UNITED STATES PATENTS

| | | | |
|---|---|---|---|
| 3,663,378 | 5/1972 | Brown | 106/1 X |
| 3,672,938 | 6/1972 | Zeblisky | 106/1 X |
| 3,817,774 | 6/1974 | Kuzmik | 106/1 X |

OTHER PUBLICATIONS

"Triton Summary," Rohm & Haas, 1965.

*Primary Examiner*—Mayer Weinblatt
*Attorney, Agent, or Firm*—James R. Hoatson, Jr.; Raymond H. Nelson; William H. Page, II

[57] ABSTRACT

Baths which are used for the electroless deposition of conductive metals on substrates are stabilized against deterioration by the addition of a surfactant and an organic stabilizing agent such as coumarin.

6 Claims, No Drawings

STABILIZATION OF METAL PLATING BATHS

This invention relates to the stabilization of metal-containing baths which are used in the electroless deposition of a metallic coating on a substrate. More specifically the invention is concerned with the addition of certain organic compounds which will stabilize a metal-containing bath against deterioration thereof.

It is known in the plating art that the deposition of metals on the surface of a substrate may be effected either by an electrolytic deposition of the metal or by an electroless deposition of the metal on the surface of a substrate. With the increased cost of metals, and particularly conductive metals such as copper, gold, silver, etc., plus an added problem of disposal of unused metals, it is becoming important in the industry that the substrates such as non-conductive laminates be clad with a very thin layer of metal. Therefore, recent developments in this area have been toward the electroless deposition of a conductive metal. By limiting the thickness of the conductive metal on the substrate, it will be economically advantageous in that, when utilizing the metal-clad substrate as a printed circuit board, to use less of the etching solutions as well as disposing of smaller amounts of spent etchant. In addition, when utilizing a metal-clad substrate in which the metal has only a thickness of from about 1 to about 20 microns, less undercutting will occur along with a finer line definition with finer or narrower circuit lines and closer spacing thus allowing greater circuit density. The printed circuit boards which may be formed are then used in the electrical and electronics industries in radios, televisions, computers, etc. However, by utilizing an electroless deposition process it has been found possible to develop relatively thin substrates of the epoxy resin-glass type, phenolic resin-glass type, etc. which have a thickness ranging from about 0.001 to about 0.008 inch which are clad with a very thin conductive metal such as copper, the thickness of the copper being from about 1 to about 20 microns. When subjecting the substrates to an electroless deposition of the metal thereon, the substrates must be treated in a series of steps culminating in an immersion in an electroless deposition bath containing the desired metal. It has now been discovered that, as will hereafter be shown in greater detail, the stability of the electroless deposition bath containing the desired metal may be increased and protected against deterioration thereof by the addition of certain compounds.

It is therefore an object of this invention to stabilize the effective life of an electroless deposition bath containing a conductive metal.

It is a further object of this invention to protect and prolong the life of an electroless deposition bath against deterioration thereof by the addition of certain organic compounds.

In one aspect an embodiment of this invention resides in a process for the electroless deposition of a metal on a substrate which comprises the steps of: (a) treating said substrate with a sensitizing solution, (b) recovering said substrate and removing all traces of the sensitizing solution, (c) treating the substrate with a catalyst activating solution, (d) recovering said substrate and removing all traces of said catalyst activating solution and (e) coating said substrate with a metal in an electroless coating bath, the improvement which comprises the addition of an organic stabilizing agent and a surfactant to said electroless coating bath.

A specific embodiment of this invention resides in an improvement in a process for the electroless deposition of a metal on a substrate in which a substrate such as an epoxy resin-glass laminate is treated with a sensitizing solution, recovered and washed to remove all traces of the sensitizing solution, treated with a catalyst activating solution, again recovered and washed to remove all traces of the catalyst activating solution and thereafter coated with copper in an electroless coating bath which contains a surfactant and an organic stabilizing agent comprising coumarin.

Other objects and embodiments will be found in the following further detailed description of the present invention.

As hereinbefore set forth the present invention is concerned with a process for the stabilization of metal plating baths and particularly baths containing metals which are used for the electroless deposition of said metals on a substrate. By utilizing these electroless deposition baths, it is possible to clad a substrate with a metal so that the thin metal coating on the substrate is adherent enough to allow the processing of these metal-clad laminates into multi-layered boards which are ductile enough to avoid breakage and in addition are capable of being electroplated either before or after an etching step to remove undesired metal and thus form a circuit. Examples of substrates upon which a conductive metal may be coated will include either thermoplastic or thermosetting resins, the thermosetting resins preferably being impregnated on a base material which will impart a preferably mechanical strength while at the same time lowering the cost of the substrate. The base materials which may be impregnated with the thermosetting resins will include paper or glass fiber which is used in either low pressure or high pressure laminates, especially where electrical properties are important in addition to low moisture absorption, high tensile flexural and comprehensive strengths, etc. In addition to the paper or glass fiber which may be used as a base material, it is also contemplated that fabrics, lignin, asbestos, or synthetic fibers such as Rayon, Nylon, Dacron, etc. may also be used. The thermosetting resins which are used to impregnate the base materials will include epoxy resins, phenolic resins, melamine resins, silicones, polyimides, acrylic resins, polyesters, etc. It is also contemplated that other substrates which may be employed will include polyethylene, polypropylene, polystyrene, or copolymers thereof. Examples of conductive metals which may be coated on the aforesaid substrates will include copper, gold, silver, nickel, etc.

As will hereinafter be shown in greater detail, the addition of suitable additives such as a surfactant and an organic compound of the type used in the present invention will act as stabilizing agents and increase the usable lifetime of an electroless metal plating bath. By utilizing the additives of the type of the present invention, it is possible to increase the lifetime of such a bath so that said bath can be used for an extended period of time which may range from 2 times up to about 10 times or more of the usable lifetime of the electroless metal depositing bath which does not contain the additives.

Examples of organic compounds which may be used to increase the usable lifetime of an electroless metal depositing bath will comprise coumarin compounds including coumarin itself as well as derivatives thereof such as the alkyl derivatives containing from 1 to about 5 carbon atoms including methyl orthocoumarate, ethyl orthocoumarate, propyl orthocoumarate, butyl orthocoumarate, amyl orthocoumarate, etc., cycloalkyl derivatives containing from 3 to about 6 carbon atoms including cyclopropyl orthocoumarate, cyclobutyl orthocoumarate, cyclopentyl orthocoumarate, cyclohexyl orthocoumarate, etc., phenyl orthocoumarate, benzyl orthocoumarate, o-tolyl orthocoumarate, etc. The coumarin or coumarate compond is preferably added to the bath as a solution, said organic compound having been dissolved in an organic solvent such as methyl alcohol, ethyl alcohol, n-propyl alcohol, isopropyl alcohol, etc., said coumarin compound being present in the electroless bath in an amount in the range of from about 0.001 up to about 1 percent. The upper limit of the coumarin compound constitutes an important factor inasmuch as it is possible, by the addition of an excess amount of said coumarin compound, to render the electroless bath too stable whereby the metal will not plate out of the bath but will remain in solution.

Examples of surfactants which may be employed as the other component of the stabilizing additive to the electroless bath will include the various surfactants based on alkylaryl polyether alcohols, sulfonates and sulfates sold under the tradename "Triton" by Rohm and Haas, specific examples being Triton X-100, Triton B-1956, etc.; or sorbitan derivatives which are cyclic ether tetrahydric alcohols or anhydrides of sorbitol such as those which are sold under the tradenames of "Span" and "Tween" by the Atlas Powder Co., specific examples of these surfactants being sorbitan monolaurate, sorbitan monopalmate, sorbitan monostearate, sorbitan tristearate, sorbitan monooleate, sorbitan trioleate, polyoxyethylene sorbitan monolaurate, polyoxyethylene sorbitan monopalmate, polyoxyethylene sorbitan monostearate, polyoxyethylene sorbitan tristearate, polyoxyethylene sorbitan monooleate, glycerol sorbitan laurate, etc. or other surfactants including glycerol mannitan laurate, polyoxyethylene lauryl ether, polyoxyethylene oleyl ether, etc. It is to be understood that the examples of coumarin compounds and surfactants, as hereinbefore enumerated, are only representative of the class of compounds which may be used, and that the present invention is not necessarily limited thereto.

As an example of a process for the electroless deposition of a metal on a laminate the substrate is subjected to a series of preparatory steps prior to the deposition of the metal thereon. For example, in one embodiment, the substrate may be treated with a work absorber comprising a polymeric mixture of a resin, a rubber formulation and a solvent, a specific example of this combination being an epoxy resin, an acrylonitrile-butadiene or acrylonitrile-butadiene-styrene formulation and an alcohol such as amyl alcohol or a ketone such as acetone or an aromatic hydrocarbon such as benzene, toluene, etc. The substrate is treated with the work absorber by wiping the surface of the substrate or by immersing the substrate in a bath of the absorber followed by a cure time at an elevated temperature in order that the solvents from the elastomeric work absorber are dried and an initiation of the curing of the polymers is begun. Thereafter the substrate is then immersed or treated with a sensitizing bath which may comprise a tin solution such as a solution of stannous chloride and stannic chloride in hydrochloric acid. The substrate after being subjected to the action of a sensitizing solution is recovered and washed to remove all traces of the sensitizing solution. Following this the substrate is then treated with a catalyst activating bath which may consist of, for example, a palladium chloride solution in hydrochloric acid. Following treatment with the catalyst activating bath, the substrate is again recovered and washed to remove all traces of the activating bath. The substrate is then subjected to the electroless deposition of the metal thereon by subjecting the substrate to immersion in a continuous agitation during the residence time in order to insure a uniform exposure to the plating solution. The electroless bath, in addition to containing the main ingredient which comprises the conductive metal to be coated on the substrate, will also contain other ingredients including an organic compound of the type hereinbefore set forth such as coumarin in an amount in a range of from about 0.001 to about 0.1 percent by weight of the solution, a surfactant in a range of from about 0.1 to about 5 percent by weight of the solution and a reductant as well as other chemicals known in the art to comprise various components of a standard electroless deposition bath. After being subjected to the action of the electroless metal deposition bath for a predetermined residence time, the metal-clad substrate is recovered and utilized for any particular purpose such as, for example, a printed circuit board for electronic or electrical circuits.

The following examples are given to illustrate the process of the present invention which will illustrate the novelty of the present invention as concerns the addition of a stabilizing agent to an electroless depositing bath when compared to the other baths which do not contain the additive. However, these examples are given merely for purposes of illustration and are not intended to limit the generally broad scope of the present invention in strict accordance therewith.

EXAMPLE I

A substrate comprising an epoxy resin-glass fiber laminate was sensitized by immersion in a sensitizing bath which was prepared by adding 30 grams of stannous chloride to a solution containing 38 grams of hydrochloric acid and 30 grams of aged 0.25 mole stannic chloride solution in a total volume of 1 liter. After sensitizing the substrate for a period of 15 minutes, the substrate was removed and washed two times with water to remove all traces of the tin-containing compound. The thus sensitized laminate was then immersed in a catalyst activating bath comprising 1 liter of water containing 0.25 grams of palladium chloride, 2.5 cc. of concentrated hydrochloric acid and 1 gram of a wetting agent known in the trade as Triton X-100. The substrate was activated for a period of 15 minutes, following which it was removed from the activating solution and washed two times with water.

An electroless deposition bath was prepared by admixing 0.003 equivalents of copper sulfate pentahydrate, 0.0059 equivalents of potassium sodium tartrate, 0.0014 equivalents of sodium carbonate, 0.012 equivalents of sodium hydroxide, 0.049 equivalents of 37% formaldehyde solution and a sufficient amount of water to reach a total weight of 30 grams for the solution. The solution was divided into 6 portions labeled A, B, C, D, E and F. To solution A was added 0.1 grams of a coumarin solution prepared by admixing 1.46 grams of coumarin in 100 grams of methyl alcohol. To solution B was added 1.0 grams of the solution. Nothing was added to solution C while 0.1 grams of the coumarin solution plus 1 gram of sodium iodide was added to solution D. To solutions E and F were added 0.5 grams of a 4% solution of 1,10-orthophenanthrene plus 1 gram of sodium iodide. The solutions were allowed to stand for a period of 52 hours. At the end of this time it was noted that solutions E and F were slowly decomposing, the presence of metallic copper being apparent in the bottom of the bottles both as a loose layer and as an adherent layer. At the end of an additional 16 hours, solutions E and F remained unchanged, solution A was 90 percent decomposed, solution C was totally decomposed, while solutions B and D were only 10 to 20 percent decomposed.

An additional amount of electroless depositing bath similar in nature to that set forth in the above paragraph was prepared. This solution was divided into 6 additional portions and labeled solutions G, H, J, K, L and M. To solution G was added 1 gram of a coumarin solution prepared by admixing 1.46 grams of coumarin in 100 grams of methyl alcohol. Solution H had added thereto 1 gram of the coumarin solution and 0.35 grams of 1% Triton X-100 solution. Solution J had added thereto 1 gram of the coumarin solution and 3.5 grams of the Triton X-100 solution. Solution K had added thereto 1 additional gram of methyl alcohol, solution L 1 gram of methyl alcohol and 0.35 grams of 1% Triton X-100 and solution M contained 1 gram of methyl alcohol and 0.35 grams of 1% Triton X-100.

The substrate, which was prepared by treatment with a sensitizing bath and catalyst activating bath according to the first paragraph of the example, was immersed in the various solutions for a period of 1.5 hours and allowed to plate for that period of time. At the end of this time, the copper plated substrate was removed and air dried at 100°C. The samples resulting from solutions H, J, L and M were plated with copper which had an excellent appearance. At the end of this time, the solutions were in various stages of stability. For example, solution A was 95 percent decomposed, solution B was 70 percent decomposed, solution C was 100 percent decomposed, while solution D was still stable, solutions E and F were still slowly decomposing, solution G was 60 percent decomposed, solutions H and J which contained 1 gram of coumarin and an additional amount of the wetting agent were stable, solution K was 70 percent decomposed, while solutions L and M contained some deposits of copper on the bottom of the bottle.

It is therefore apparent from the above comparisons that the solutions which contained the organic compound additives such as coumarin plus the wetting agent exhibited a relatively stable condition and still possessed the ability to deposit copper in an electroless deposition process on a substrate.

EXAMPLE II

In a manner similar to that set forth in Example I above, an electroless deposition bath comprising 0.2 grams of potassium gold cyanide, 7.5 grams of ammonium chloride, 5.0 grams of sodium citrate and 1.0 grams of sodium hypophosphite in 100 cc. of water is prepared and divided into 7 portions. Solution A is left blank while to solution B is added 0.1 grams of a coumarin solution which is prepared by admixing 1.46 grams of coumarin in 100 grams of methyl alcohol. To solution C is added 0.1 grams of coumarin plus 0.35 grams of a wetting agent known in the trade as Triton X-100. To solution D is added 0.1 grams of coumarin plus 3.5 grams of Triton X-100. Solution E receives 1 additional gram of methyl alcohol, solution F 1 gram of methyl alcohol and 0.35 grams of Triton X-100 and solution G 1 gram of methyl alcohol and 3.5 grams of Triton X-100. The solutions were allowed to stand for a period of 52 hours, at the end of which time it will be noted that solution A is totally decomposed, solutions B, C, and D will be stable while solutions E, F and G will show some evidences of decomposition by the presence of metallic gold.

A substrate comprising a phenolic resin-glass laminate is sensitized by immersion in a sensitizing bath comprising a tin chloride solution for a period of 15 minutes. The substrate is then removed, washed with water and immersed in a catalyst activating bath containing palladium chloride. Following activation of the substrate, it is removed, washed and immersed in the electroless deposition baths containing the potassium gold cyanide. The substrate will be uniformly plated by solutions B, C and D which, as hereinbefore set forth, exhibit a stability which is not found in the other solutions. In addition, solutions E, F and G will also plate the substrate although the appearance of the gold will be less attractive than that of the substrate which has been plated from solutions B, C and D.

EXAMPLE III

In this example a silver deposition bath is prepared by admixing silver nitrate, potassium hydroxide, dextrose and nitric acid in an ethanol medium. This bath is then divided into 7 aliquot portions and treated in a manner similar to that set forth in Example II above by adding various amounts of coumarin, Triton X-100 and methyl alcohol to the aliquot portions in amounts identical to that set forth in the above example. A substrate comprising a melamine resin-glass laminate is then treated in a manner similar to that hereinbefore set forth in Examples I and II above, that is, by sensitizing and activating the laminate. The laminate is plated with the silver solution after the various solutions have been allowed to stand for a period of 60 hours. The blank solution containing no additives is decomposed and will not plate the laminate. The laminate solutions which have additives present will plate the laminate, however, the solutions which contain the coumarin and coumarin plus wetting agent additive will present a more uniform appearance and in addition the solutions will not exhibit any signs of decomposition in contrast to the solutions which contain only the methyl alcohol or methyl alcohol and wetting agent, the latter solutions exhibiting some signs of decomposition plus a less uniform appearance of the silver plate.

I claim as my invention:

1. In the electroless deposition of copper on a substrate comprising a thermosetting resin, wherein the substrate is coated with copper in an electroless coating bath containing dissolved copper, the method of prolonging the usable life of said bath which comprises adding thereto from about 0.001 to about 1 percent by weight of a coumarin compound selected from the group consisting of coumarin, alkyl coumarins containing from 1 to about 5 carbon atoms in the alkyl group, and cyclopropyl, cyclobutyl, cyclopentyl, cyclohexyl, phenyl, benzyl and tolyl orthocoumarates and from about 0.1 to about 5 percent by weight of a surfactant selected from the group consisting of alkyaryl polyether alcohols, sulfonates and sulfates and cyclic ether tetrahydric alcohols and anhydrides of sorbitol.

2. The method as set forth in claim 1 in which said coumarin compound is coumarin.

3. The method as set forth in claim 1 in which said substrate is an epoxy resin-glass laminate.

4. The method as set forth in claim 1 in which said substrate is a phenolic resin-glass laminate.

5. The method as set forth in claim 1 in which said substrate is a melamine resin-glass laminate.

6. The method as set forth in claim 1 in which said surfactant is an alkylaryl polyether alcohol.

* * * * *